Sept. 25, 1951     D. L. PERROT     2,568,821
MACHINE FOR HANDLING SLUDGE
Filed March 16, 1949     2 Sheets-Sheet 1
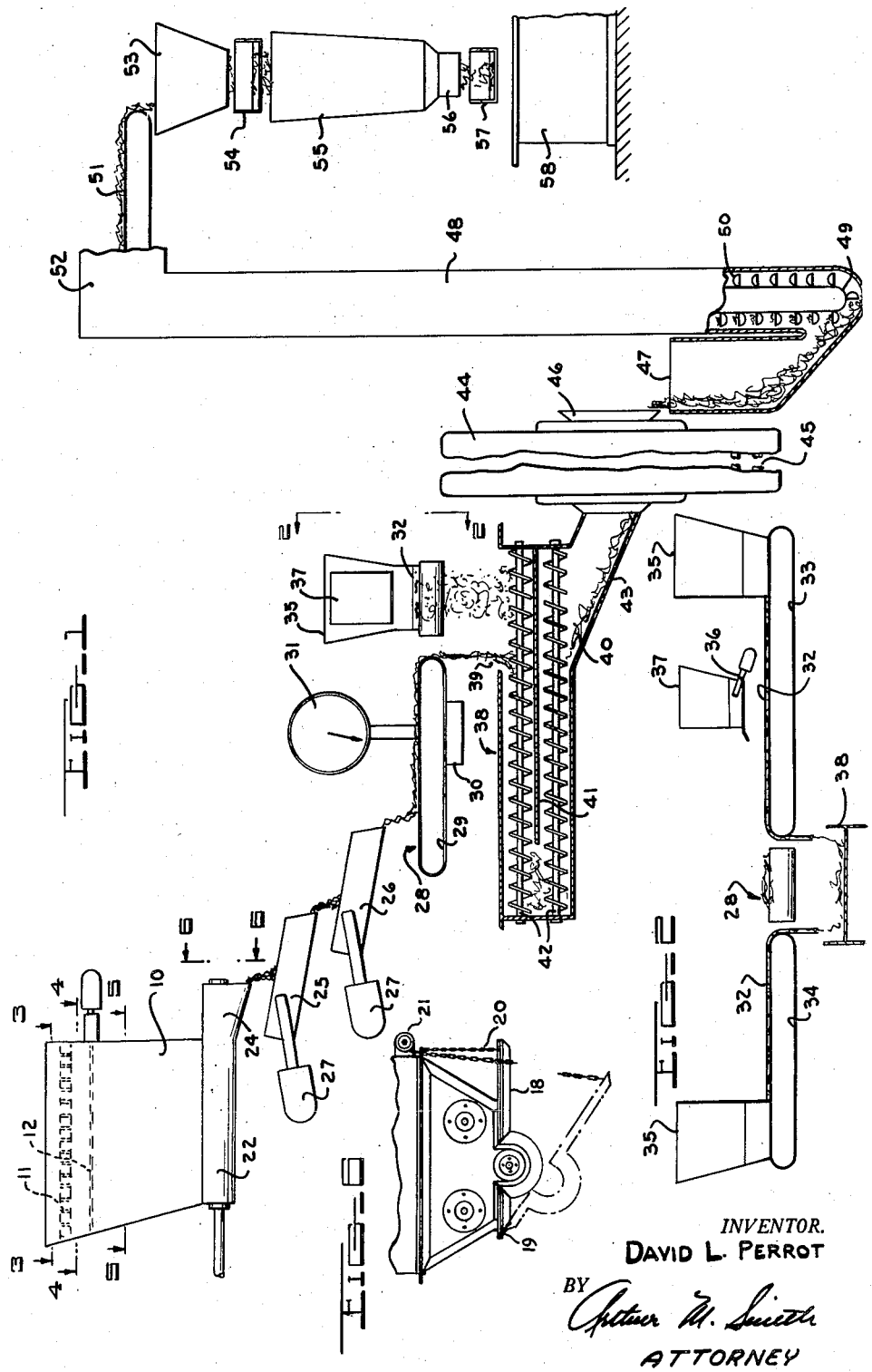
INVENTOR.
DAVID L. PERROT
BY
ATTORNEY Sept. 25, 1951       D. L. PERROT       2,568,821
MACHINE FOR HANDLING SLUDGE
Filed March 16, 1949       2 Sheets-Sheet 2
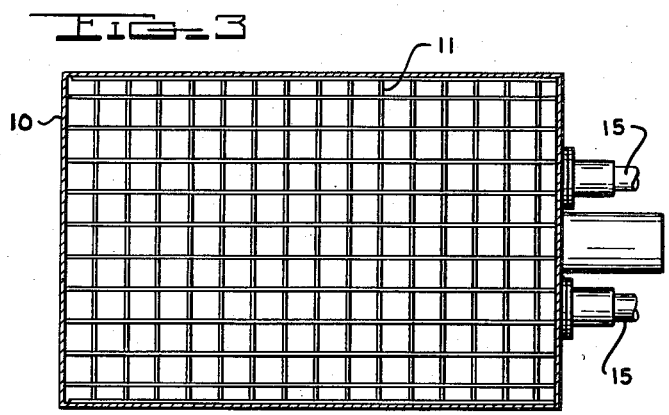
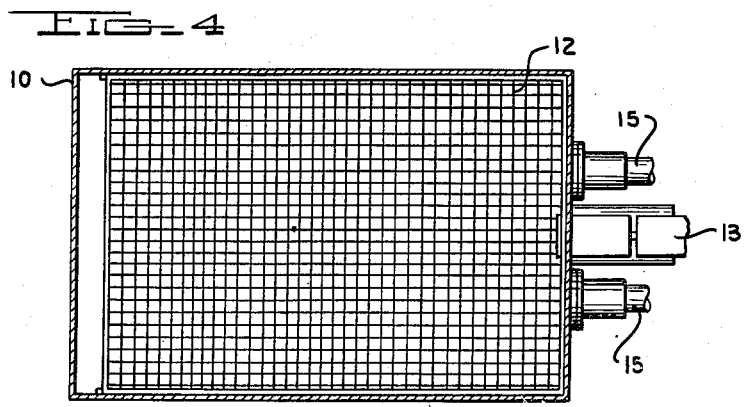
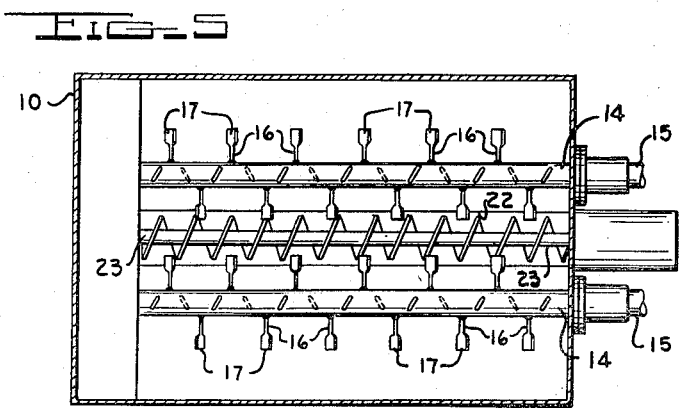
INVENTOR.
DAVID L. PERROT
BY
ATTORNEY Patented Sept. 25, 1951

2,568,821

UNITED STATES PATENT OFFICE 2,568,821

MACHINE FOR HANDLING SLUDGE

David L. Perrot, Saginaw, Mich., assignor to Jackson and Church Company, Saginaw, Mich., a corporation of Michigan Application March 16, 1949, Serial No. 81,811

12 Claims. (Cl. 259—154)

The present application relates to apparatus for the manufacture of sand-lime bricks or blocks.

It has been conventional in the manufacture of sand-lime bricks or blocks to mix proportionate amounts of dry hydrated lime with silica sand and then pour the moist mix into molds in which the mix is compressed to the final shape of the brick. The compressed brick or block is then removed from the mold and transported to steam curing kilns.

The major portion of the conventional sand-lime brick or block comprises the sand aggregate, the lime serving as a binder between the sand particles and comprising only about one-tenth the weight of the brick or block, the latter proportion being varied according to the properties desired. In order to serve as an efficient binder and to make intimate contact with the surfaces of the sand particles, the individual lime particles must be appreciably smaller than the individual sand particles. Thus, in the conventional mix wherein the lime is supplied in the dry form, the particle size of commercially available powdered lime definitely limits the fineness of the sand which may be used as the aggregate, permitting only the use of relatively coarse sand for best results.

The intimate association between the sand and lime which determines the ultimate strength of the brick or block is increased during the compression and molding of the uncured brick or block. Thus, it is desirable to use high compressive forces in the molding steps. The dry hydrated lime, despite careful mixing of the batch, carries considerable entrained air into the mix. As a consequence, the air in the mix tends to resist the compressing forces and frequently forces the mix to flow out of the mold during the compression operation. This retards the rate of production and causes considerable wastage of the materials. Accordingly, in order to hold the production and reduce wastage, the maximum pressures which are applied to the brick or block during the molding operation in conventional processes are considerably lower that the optimum pressures required to produce the most satisfactory physical properties in the finished brick or block.

The uniformity and fineness of the lime particles are also primary factors determining the strength of the brick or block, since the strength is enhanced by increasing the area of surface contact between the sand and lime particles. This is achieved by increasing the total surface area of the lime particles which is available for bonding with the sand, without increasing the total lime content. It is apparent that as the size of the individual lime particles is decreased, the total surface area of a given amount of lime is increased and a more intimate contact between the sand and the lime will be possible as a result of the decreased particle sizes and the increased available surface areas.

In my co-pending application, Serial No. 11,871, filed February 27, 1948, a method for commercial production of sand-lime bricks or blocks is disclosed wherein the lime is utilized as a wet sludge, the lime being of a precipitate fineness and free of entrained air. The sludge comprises primarily a dispersion of fine lime particles in water, which permits the use of a finer sand the attainment of a more uniform homogeneous mix having greater intimacy of surface contact over large surface areas of the sand and lime particles and permits the use of greater pressures during the compression molding than is possible in the conventional manufacture of sand-lime bricks or blocks.

Briefly, the process disclosed in the above application proposes a formulation of a sludge of thoroughly hydrated suspended lime particles wherein the lime is formêd initially as a sludge precipitate by chemically combining calcium and oxygen ions in a water solution. The uncombined calcium and oxygen ions are brought together in a water solution and precipitated as relatively insoluble calcium oxide, i. e., lime, in a controlled process whereby the particles of the resultant precipitate are dispersed as fine suspensoids. The sludge is used directly in the manufacture of bricks or blocks before the sludge dries and before the individual lime particles are permitted to form appreciable amounts of larger agglomerates. The lime is thus used in the most desirable form as a suspension of minute particles which are finer than may be feasibly obtained by commercial pulverizing processes. In addition, the cost of drying such sludge and of pulverizing the dried solids is avoided.

Considerable difficulty has been experienced in providing an apparatus for carrying out the above method since on a commercial scale it is difficult to use the sludge prior to formation of considerable amounts of lime agglomerates in the sludge. The difficulties in the process are primarily inherent in feeding the sludge at a constant rate in order that it may be continuously mixed in constant proportions with the sand and other aggregate and also in freeing the sludge of entrapped water so that this water may be employed to wet the aggregate and to bind the lime and aggregate in the finished brick or block. The freed water in this condition may be easily vaporized during kiln drying of the brick or block.

The above difficulties as stated are primarily due to a tendency of the fine particles of lime to form larger particles or agglomerates. While the lime is initially present in the sludge as a dispersion of substantially molecular particles, upon standing the fine particles tend to join or adhere to other particles to form agglomerates of lime. Considerable water is entrapped within these agglomerates. The sludge, as used, has a rather dry appearance and tends to feed through the apparatus in an irregular fashion. The entrapped water within the agglomerates will not wet the aggregate but instead remains entrapped until the brick or block is kiln-dried. Even then the brick must be subjected to high temperatures for long periods of time to remove the entrapped water and the finished brick or block is left rather porous and is of a relatively low quality.

In the apparatus of the present invention, the sludge is first screened or sifted to remove any large solid particles or impurities. It is then agitated in a hopper by paddles or similar apparatus to provide a homogeneous lime solution or emulsion and also to partially reduce the particle size of the lime agglomerates to free some of the entrapped water. After the sludge has been agitated, it is then vibrated at a suitable frequency to further subdivide the lime agglomerates and free substantially all of the entrapped water. While a single frequency of vibration has been found suitable, it is preferable to vibrate the sludge successively at different frequencies, the frequencies depending particularly on the state of subdivision of the lime agglomerates.

Following the vibration operation, the sludge has a rather wet appearance but is still quite viscous and therefore still occasionally feeds at a somewhat irregular rate, even with a vibrating feeder. The rate of feed of the sludge must be coordinated with the rate of feed of the aggregates. The present invention therefore provides a visual means for continually checking the weight of sludge entering a mixing chamber and a means for varying the rate of feed of the sludge for momentary periods to compensate for the occasional irregularities in the feed thereof.

Due to the fine particle suspension of lime entering the mixing chamber, very fine sands or other aggregate may be employed in the apparatus. Preferably, a blend of sand is used to provide the most satisfactory finished brick. Although the sand blend may be previously prepared, it is ordinarily desirable to meter the desired proportions of the different sands individually into the mixing chamber. In this case, the sand is deposited on a plurality of feed belts and the thickness of the sand layer thereon is controlled to provide a constant proportion of sand relative to the other ingredients in the mix.

The lime sludge and sands are then mixed in a continuous fashion in the mixing chamber. While this chamber may be sufficient to provide a suitable homogeneous lime-sand admixture, it is generally desirable to pass the mixture from the mixing chamber into a rod mill or similar apparatus, wherein the mixture is kneaded, ground and mixed into a substantially constant homogeneous admixture. In this mixture, the sand and lime particles are in intimate contact and the water, previously freed from the lime agglomerates, thoroughly wets the sand.

In this condition, the mixture is ready to be formed into the desired brick or block in a conventional press, prior to subjecting the brick or block to a kiln-drying operation. The mixture is relatively dry and, preferably, is fed into the press by a vibrating feeder. It has been found that a single vibrating feeder may be advantageously employed for feeding several presses.

In the apparatus of the present invention the desired admixture of lime sludge, sand and other additives are mixed in a continuous manner. The admixture is constant and homogeneous. The admixture has a uniform moisture content. The admixture is substantially free from entrapped water and is therefore relatively easily kiln-dried. The apparatus may be operated continuously for long periods of time without varying the proportions of ingredients or without becoming clogged due to the plasticity of the lime sludge or lime-sand mixture.

It is therefore a primary object of the present invention to provide an apparatus for the continuous manufacture of sand-lime bricks or blocks in which a sludge comprising primarily a dispersion of fine lime particles in water may be homogeneously mixed with sand and other aggregates.

Another object of the invention is to provide an apparatus of the above type which will continuously meter a constant proportion of lime, sand and other aggregates into a mixing chamber, mix the constituents into a homogeneous mixture, and feed the so-mixed mixture to a brick or block machine.

Another object is to provide an apparatus wherein the sludge is screened or sifted to remove any large particles or impurities therefrom.

Another object is to provide an apparatus of the above type wherein the sludge is agitated to partially subdivide the lime particles and to mix the sludge into a homogeneous dispersion.

Another object of this invention is to provide an apparatus wherein the lime sludge is vibrated to reduce the particle size of the lime agglomerates and free any entrapped water held within the lime agglomerates.

Another object of the invention is to provide an apparatus wherein the amount of lime sludge continuously entering the mixing chamber may be readily observed and wherein the rate of feed of the sludge may be quickly varied to maintain a constant proportion of sludge relative to the amounts of sand and other additives.

Another object is to provide an apparatus of the above type having a common feed mechanism for supplying a plurality of brick or block presses.

Other objects of this invention will appear in the following description and appended claims, reference being had to the accompanying drawings forming a part of this specification wherein like reference characters designate corresponding parts in the several views.

In the drawings:

Fig. 1 is a schematic view of an apparatus for continuously manufacturing bricks or blocks and embodying the features of the present invention.

Fig. 2 is an end elevation looking in the direction of the arrows 2—2 in Fig. 1.

Fig. 3 is a sectional view of the sludge hopper taken substantially on the plane indicated by the line 3—3 of Fig. 1.

Fig. 4 is a sectional view of the sludge hopper taken substantially on the plane indicated by the line 4—4 of Fig. 1.

Fig. 5 is a sectional view of the sludge hopper taken substantially on a plane indicated by the line 5—5 of Fig. 1.

Fig. 6 is an end elevation of the bottom of a sludge hopper looking in the direction indicated by the arrows 6—6 of Fig. 1 and showing, in phantom, the bottom plate in open position.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

An apparatus for making sand-lime bricks or blocks in a continuous process using a lime sludge and embodying the features of the present invention, is shown schematically in the drawings. The lime sludge is initially charged into the hopper 10, through an opening in the top thereof and is screened or sifted through the grid 11 and the vibrating screen 12. The grid 11 is rigidly secured within the walls of the hopper adjacent the top opening therein and comprises a plurality of crossed plates or bars constructed of a relatively strong material. The grid has a coarse mesh and is employed in the hopper primarily to protect the screen while charging the hopper and also to assist in distributing the sludge charge over the entire area of the screen.

The vibrating screen 12 is positioned in the hopper below the grid and is mounted therein for reciprocating or vibratory movement in a substantially horizontal plane. The movement of the screen is effected by any suitable vibrating mechanism 13, such as a solenoid and a return spring.

The hopper 10 is also provided with a pair of laterally spaced agitators 14 shown in Fig. 5 positioned therein below the screen 12 and journaled in the hopper for rotation about a longitudinal axis disposed substantially horizontal. The agitators each have a shaft extension 15 adapted to engage any suitable prime mover and also a plurality of circumferentially and axially spaced paddles 16 extending radially outward therefrom. Each paddle terminates in a flat portion 17 which lies in a plane angularly disposed to the longitudinal axis of the agitator.

The bottom 18 of the hopper 10 shown particularly in Fig. 6, is hinged to one side of the hopper by the hinges 19 to provide a clean out therefor and is controlled by a chain 20, extending over a wheel 21. The bottom 18 is provided with an intermediate cylindrical portion 22 forming a feed channel for the sludge into which a worm gear 23 is positioned. The cylindrical portion 22 terminates in a sloping chute 24, Figure 1, for guiding the sludge from the hopper 10. The worm gear 23 is journaled in a wall portion of the hopper in order that the bottom of the latter may be cleaned without removing the worm gear.

The vibrating feeder 25 is positioned under the discharge end of the hopper 10 and a second vibrating feeder 26 is positioned so as to receive the sludge discharged from the first vibrating feeder 25. Each of these feeders are of similar conventional design but are adjusted to vibrate preferably at different frequencies. As shown schematically the feeders are provided with a vibrating mechanism 27, such, for example, as a solenoid and a return spring.

A weight belt 28 is positioned under the second vibrating feeder 26 to receive the sludge discharged therefrom and comprises an endless conveyor belt 29 supported by a scale 30 having a weight indicator 31. The conveyor belt 29 preferably has a variable speed so that the linear velocity thereof may be changed to compensate for variations in the rate of sludge feed, indicated by the indicator 31.

The sand 32 and other desirable aggregates are fed simultaneously with the sludge by the endless conveyor belts 33 and 34 respectively from opposite sides of the weigh belt 28, shown particularly in Fig. 2. Each belt 33 and 34 is positioned under a hopper 35 and continuously carries a predetermined quantity of sand or other aggregate from the respective hoppers 35. The amount of sand fed by each belt is determined by the depth of the layer thereon and the linear velocity of the belt, the former being controlled by any suitable means such as a scraper or knife blade spaced above the belt and secured to the hopper 35.

An additional aggregate may be also synchronously fed with the sludge and sand. This may be accomplished, as shown in the drawings, by means of a vibrating feeder 36 positioned above the conveyor belt 33 and communicating with a hopper 37 containing the aggregate. The latter is fed onto the belt 33 at any desired rate, the rate being controlled by the rate of vibration of the feeder 36.

The sludge weigh belt 28 and the aggregate conveyor belts 33 and 34 each continuously discharge into a continuous mixing chamber 38, shown particularly in Figure 1. The mixing chamber is provided with an upper inlet opening 39 adjacent one end thereof and a lower discharge opening 40 at the same end of the chamber. A partition 41 separates the chamber into vertically spaced feed channels, each provided with a worm gear 42 journaled in opposite ends of the chamber. As shown in the drawings, the partition 41 terminates short of one end of the chamber to allow communication between the spaced feed channels. The worm gears 42 are axially rotated in opposite directions to continuously move the lime-stand mixture between the inlet opening 39 and the discharge opening 40. These gears may be driven by any suitable means. The mixing chamber is also provided at the discharge opening with a discharge chute 43 which extends into an opening in one end of a rod mill 44.

The rod mill or kneading mill 44 is of a conventional design and is provided with axial inlet and discharge openings at opposite ends thereof. The mill is supported for rotation about a longitudinal axis thereof and is provided therein with a plurality of metal rods 45 which are free to roll within the mill upon rotation thereof. The rod mill has an annular flaring rim 46 surrounding the discharge opening which overhangs an elevator hopper 47 and directs the sand-lime mixture thereinto from the mill.

The hopper 47 is formed integral and communicates with a vertically extending elevator housing 48. The latter encloses an endless belt 49, shown schematically, having a plurality of cups 50 spaced longitudinally thereof. The elevator belt is adapted to carry the homogeneous sand-lime admixture from the rod mill 44 to the endless conveyor belt 51. As shown in Fig. 1, the housing 48 has a transverse extension 52 which also encloses the belt 51.

The discharge end of the conveyor belt 51 is positioned above a chute 53 which directs the sand-lime admixture into another vibrating feeder 54. The chute, as shown, has converging side walls and is open at the top and bottom, thereof.

A press hopper 55 is positioned below the vibrating feeder 54 to receive the sand-lime admixture therefrom and is of sufficient proportions to contain the continuous admixture feed between successive feedings to the brick or block presses. The hopper 55 is shown having converging walls terminating in a restricted discharge pipe 56.

Another vibrating feeder 57 is positioned below the hopper 55 and is adapted to feed a plurality of brick machines or presses, shown schematically at 58.

The relative proportions of the sludge, sands and other aggregates emptying into the mixing chamber may be individually controlled. The sands may be controlled by the linear velocity of the conveyor belt and also by the position of the scraper or knife which regulates the layer thickness on the belt. The aggregate may be controlled by the frequency of the vibrating feeder 36.

The rate of feed of the sludge, in the long run, is controlled by the worm screw positioned within the sludge hopper 10. However, momentary or short-run changes may be effected by either of the vibrating feeders 25 and 26 or preferably by the conveyor weigh belt 28.

Due to the somewhat plastic consistency of the lime sludge, the material occasionally feeds from the vibrator at a somewhat irregular rate. These fluctuations in the rate of feed of the sludge will immediately reflect on the scale indicator and the linear velocity of the weigh belt may then be momentarily changed to compensate for these variations. This is an important feature of the invention. If it is found that the weight of sludge registering on the scale is consistently low or high this condition may be corrected by changing the rate of speed of the feed screw 23 in the sludge hopper.

While the vibrating feeders 25 and 26 may be used to effect momentary changes in the rate of feed of the sludge, the frequency of the vibrating feeders is preferably individually adjusted to effect the maximum particle subdivision of the lime in the sludge in order that the water content may be freed to provide a final mixture having a minimum of entrapped water and having a water content most suitable for the final brickmaking operation. The vibrator frequencies are therefore preferably dependent upon the state of particle subdivision of the lime and the viscosity of the lime sludge.

In using the vibrating feeders and weigh belt for feeding sludge to the mixing chamber, it should be apparent that the lime sludge may be fed in a continuous manner and at a relatively constant rate. The scale serves as a constant check on the weight of lime sludge entering the mixing chamber and the linear velocity of the weigh belt may be varied to compensate for variations in the rate of feed of the sludge into the mixing chamber. The vibrating feeders primarily operate to subdivide the agglomerates of lime in the sludge and to free the entrapped water therein to provide a less viscous liquid.

The original particles of the lime sludge entering the vibrating feeders have a somewhat dry appearance, but after subdivision by the vibrating feeders substantial water is freed therefrom to wet the sand and other aggregates. The sludge entering the mixing chamber is quite plastic and wet in appearance. Substantially all of the water originally present within the sludge is thus effectively employed in the final mix to bind the components of the brick. The time required for kiln-drying the brick is substantially decreased and the final brick is of a stronger and more uniform quality.

The apparatus disclosed herein will thus continuously feed a constant predetermined proportion of a highly homogeneous sand-lime admixture to a brick or block making machine. The sludge is agitated to give a homogeneous sludge mixture and vibrated to free any entrapped water within the lime agglomerates, preferably by a plurality of vibrating feeders. The less viscous sludge may then be fed at a relatively constant rate into the mixing chamber in synchronization with the sand feeds, and any variations in the rate of feed of the sludge will immediately be indicated on the indicator scale. The weigh belt has a variable speed and may be adjusted to compensate for momentary variation in the rate of feed of the sludge into the mixing chamber. By this means the amounts of sludge relative to the amounts of sand may be maintained.

The apparatus disclosed may operate for long periods of time without varying the predetermined percentages by weight of the various constituents and without becoming clogged due to the plasticity of the sludge or sand-lime admixture.

Although the apparatus of the present invention is described in connection with the manufacture of sand-lime brick, it is apparent that the apparatus may be used to produce bricks or similar articles wherein the fine lime sludge is admixed with other materials, such for example, as fly ash and the like.

Having thus described my invention, I claim:

1. An apparatus for handling a fine dispersion of lime sludge and for mixing the same with a predetermined amount of aggregate into a homogeneous mixture, said apparatus comprising a vibrating feeder for feeding the sludge and adapted to vibrate at a frequency such that the entrapped water held within the lime agglomerates is freed to wet the aggregates, a worm gear for feeding the sludge onto said vibrating feeder, a mixing chamber, means for continuously feeding a constant weight of sludge from said feeder into said mixing chamber, means for simultaneously feeding measured quantities of aggregates into said mixing chamber and a vibrating feeder adapted to feed the homogeneous admixture from said chamber into a press.

2. An apparatus for handling a fine dispersion of lime sludge and mixing the same with predetermined amounts of aggregate into a homogeneous mixture, said apparatus comprising a plurality of vibrating feeders for feeding the sludge in series, each vibrating feeder being adapted to vibrate at a different frequency wherein the entrapped water held within lime applomerates therein may be freed to wet the aggregate, a mixing chamber, means for feeding a constant weight of sludge from said vibrating feeder into said mixing chamber, means for simultaneously feeding predetermined quantities of aggregates into said mixing chamber, and a vibrating feeder adapted to feed the homogeneous mixture from said mixing chamber into a press.

3. An apparatus for handling a fine dispersion of lime sludge and for mixing the same with a predetermined amount of aggregate into a homogeneous mixture, said apparatus comprising a hopper for the sludge, a vibrator feeder for feeding the sludge from said hopper and adapted to vibrate at a frequency wherein entrapped water held within lime agglomerates therein may be freed to wet the aggregate, a worm gear disposed within said hopper for positively feeding the sludge onto said vibration feeder, a mixing chamber, means for continuously feeding a constant weight of sludge from said feeder into said mixing chamber, means for simultaneously feeding measured quantities of aggregates into said mixing chamber, a kneading mill for kneading the mixture into a homogeneous admixture, means for feeding the admixture to said kneading mill, and a vibrating feeder adapted to feed the homogeneous admixture from said chamber into a press.

4. An apparatus for handling a fine dispersion of lime sludge and mixing the same with predetermined amounts of aggregate into a homogeneous mixture, said apparatus comprising a hopper for the sludge, a vibrating feeder for feeding the sludge from said hopper and adapted to vibrate at a frequency wherein the entrapped water held within lime agglomerates therein may be freed to wet the aggregate, a worm gear disposed in said hopper for positively feeding the sludge onto said vibrating feeder, a mixing chamber, means for continuously feeding a constant weight of the sludge from said vibrating feeder into said mixing chamber, said means including a weigh belt having an indicator associated therewith to indicate variations in rate of feed of the sludge, means for simultaneously feeding measured quantities of aggregate into said mixing chamber and a vibrating feeder adapted to feed the homogeneous admixture from said mixing chamber into a press.

5. An apparatus for handling a fine dispersion of lime sludge and mixing the same with predetermined amounts of aggregate into a homogeneous mixture, said apparatus comprising a hopper for the sludge, a vibrating feeder for feeding the sludge from said hopper and adapted to vibrate at a frequency wherein the entrapped water held within lime agglomerates therein may be freed to wet the aggregate, a worm gear disposed within said hopper for positively feeding the sludge onto said vibrating feeder, a mixing chamber, means for continuously feeding a constant weight of the sludge from said vibrating feeder into said mixing chamber, said means including a weigh belt having an indicator associated therewith to indicate variations in the rate of feed of the sludge, means for simultaneously feeding measured quantities of aggregate into said mixing chamber, a kneading mill for kneading said mixture into a homogeneous admixture, means for feeding the admixture from said mixing chamber to said kneading mill, and a vibrating feeder adapted to feed the homogeneous mixture from said mill into a press.

6. An apparatus for handling a fine dispersion of lime sludge and mixing the same with predetermined amounts of aggregate into a homogeneous mixture, said apparatus comprising a hopper for the sludge, a plurality of vibrating feeders for feeding the sludge in series from said hopper, each vibrating feeder being adapted to vibrate at a different frequency wherein the entrapped water held within the lime agglomerates therein may be freed to wet the aggregate, a mixing chamber, means for feeding a constant weight of sludge from said vibrating feeders into said mixing chamber, means for simultaneously feeding predetermined quantities of aggregate into said mixing chamber, a kneading mill for kneading the mixture into a homogeneous admixture, means for feeding the admixture from said mixing chamber to said mill, and a vibrating feeder adapted to feed the homogeneous admixture from said mill into a press.

7. An apparatus for handling a fine dispersion of lime sludge and mixing the same with predetermined amounts of aggregate into a homogeneous mixture, said apparatus comprising a hopper for the sludge, an agitator positioned in said hopper and adapted to agitate the sludge into a homogeneous consistency, a vibrating feeder for continuously feeding the sludge from said hopper and adapted to vibrate at a frequency wherein the entrapped water held within lime agglomerates therein may be freed to wet the aggregate, a worm gear disposed within said hopper for positively feeding the sludge onto said vibrating feeder, a mixing chamber, means for feeding a constant weight of the sludge from said vibrating feeder into said mixing chamber, means for simultaneously feeding measured quantities of aggregate into said mixing chamber, a kneading mill for kneading said mixture into a homogeneous admixture, means for feeding said admixture from said mixing chamber into said kneading mill, and a vibrating feeder adapted to feed the homogeneous admixture from said mill into a press.

8. An apparatus for handling a fine dispersion of lime sludge and mixing the same with predetermined amounts of aggregate into a homogeneous mixture, said apparatus comprising a hopper for the sludge, a screen supported in said hopper and adapted to vibrate in a horizontal plane, an agitator positioned in said hopper and adapted to agitate the sludge into a homogeneous consistency, a vibrating feeder for continuously feeding the sludge from said hopper and adapted to vibrate at a frequency wherein the entrapped water held within lime agglomerates therein may be freed to wet the aggregate, a mixing chamber, means for feeding a constant weight of the sludge from said vibrating feeder into said mixing chamber, means for simultaneously feeding measured quantities of aggregate into said mixing chamber, a kneading mill for kneading said mixture into a homogeneous admixture, means for feeding said admixture from said mixing chamber to said kneading mill, and a vibrating feeder adapted to feed the homogeneous admixture from said mill into a press.

9. An apparatus for handling a fine dispersion of lime sludge and mixing the same with predetermined amounts of sand into a homogeneous mixture, said apparatus comprising a hopper for the sludge, an agitator in said hopper for agitating the sludge into a homogeneous consistency, a plurality of vibrating feeders for continuously feeding the sludge from said hopper, said vibrating feeders being adapted to vibrate at different frequencies wherein the entrapped water held within lime agglomerates therein may be freed to wet the sand, a mixing chamber, means for feeding a constant weight of sludge from said vibrating feeders into said mixing chamber, said means including a weigh belt having an indicator to indicate variations in the rate of feed of the sludge, means for simultaneously feeding measured quantities of sand into said mixing chamber, a kneading mill for kneading the mixture into a homogeneous admixture, means for feeding the admixture into said kneading mill, and a vibrating feeder adapted to feed the homogeneous admixture from said mill into a plurality of presses.

10. In an apparatus for handling a fine dispersion of lime sludge having a sludge hopper and a mixing chamber, a vibrating feeder disposed below the discharge opening in the hopper for receiving sludge therefrom and inclined relative to the horizontal to permit gravitational feeding of the sludge from a discharge edge thereof, a worm gear disposed within the hopper for positively feeding the sludge onto said vibrating feeder, and an endless weigh belt positioned below the discharge edge of said vibrating feeder and adapted to feed a constant weight of sludge into the mixing chamber.

11. In an apparatus for handling a fine dispersion of lime sludge in accordance with claim 10 and being further characterized in that the linear speed of said weigh belt relative to said vibrating feeder is adjustable.

12. An apparatus for handling a fine dispersion of lime sludge and for mixing the same with a predetermined amount of aggregate into a homogeneous mixture, said apparatus comprising a vibrating feeder for feeding the sludge and adapted to vibrate at a frequency such that the entrapped water held within the lime agglomerates is freed to wet the aggregate, a worm gear for positively feeding the lime sludge onto said vibrating feeder, a mixing chamber, means for continuously feeding a constant weight of sludge from said feeder into said mixing chamber, means for simultaneously feeding measured quantities of aggregate into said mixing chamber and means adapted to feed the homogeneous admixture from said chamber into a press.

DAVID L. PERROT.

REFERENCES CITED

The following references are of record in the file of this patent:

UNITED STATES PATENTS

| Number | Name | Date |
|---|---|---|
| 807,522 | Warner | Dec. 19, 1905 |
| 857,742 | Lanquist | June 25, 1907 |
| 1,270,332 | Schaffer | June 25, 1918 |
| 2,071,373 | Wurzbach et al. | Feb. 23, 1937 |
| 2,134,361 | French | Oct. 25, 1938 |
| 2,285,765 | Carswell | June 9, 1942 |